(12) United States Patent
Johnson et al.

(10) Patent No.: US 6,196,910 B1
(45) Date of Patent: *Mar. 6, 2001

(54) POLYCRYSTALLINE DIAMOND COMPACT CUTTER WITH IMPROVED CUTTING BY PREVENTING CHIP BUILD UP

(75) Inventors: David M. Johnson, Henderson, NC (US); John W. Lucek, Powell, OH (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,460

(22) Filed: Aug. 10, 1998

(51) Int. Cl.[7] .................................................. B23F 21/03
(52) U.S. Cl. ............................ 451/540; 451/539; 451/542
(58) Field of Search ................................. 451/540, 539, 451/542

(56) References Cited

U.S. PATENT DOCUMENTS

| | | |
|---|---|---|
| 2,941,241 | 6/1960 | Strong . |
| 2,941,248 | 6/1960 | Hall . |
| 2,947,611 | 8/1960 | Bundy . |
| 2,947,617 | 8/1960 | Wentorf, Jr. . |
| 3,136,615 | 6/1964 | Bovenkerk et al. . |
| 3,141,746 | 7/1964 | De Lai . |
| 3,233,988 | 2/1966 | Wentorf, Jr. et al. . |
| 3,381,428 | 5/1968 | Sillman . |
| 3,609,818 | 10/1971 | Wentorf, Jr. . |
| 3,745,623 | 7/1973 | Wentorf, Jr. et al. . |
| 3,767,371 | 10/1973 | Wentorf, Jr. et al. . |
| 3,831,428 | 8/1974 | Wentorf, Jr. et al. . |
| 3,850,591 | 11/1974 | Wentorf, Jr. et al. . |
| 3,852,078 | 12/1974 | Wakatsuki et al. . |
| 3,876,751 | 4/1975 | Alexeevsky et al. . |
| 3,918,219 | 11/1975 | Wentorf, Jr. et al. . |
| 4,063,909 | 12/1977 | Mitchell . |
| 4,188,194 | 2/1980 | Corrigan . |
| 4,289,503 | 9/1981 | Corrigan . |
| 4,334,928 | 6/1982 | Hara et al. . |
| 4,394,170 | 7/1983 | Sawaoka et al. . |
| 4,403,015 | 9/1983 | Nakai et al. . |
| 4,437,800 | 3/1984 | Araki et al. . |
| 4,601,423 | 7/1986 | Pipkin et al. . |
| 4,784,023 | 11/1988 | Dennis . |
| 4,797,326 | 1/1989 | Sillag . |
| 4,954,139 | 9/1990 | Cerutti . |
| 4,972,637 | 11/1990 | Dyer . |
| 5,007,207 | 4/1991 | Phaal . |
| 5,046,899 | 9/1991 | Nishi . |
| 5,307,704 | 5/1994 | Müller et al. . |
| 5,355,969 | 10/1994 | Hardy et al. . |

FOREIGN PATENT DOCUMENTS

| | | |
|---|---|---|
| 195 27 696 | 1/1997 | (DE) . |
| 332283 | 9/1989 | (EP) . |

*Primary Examiner*—David A. Scherbel
*Assistant Examiner*—Shantese McDonald

(57) ABSTRACT

The present invention discloses a new surface geometry of a polycrystalline diamond (PCD) cutter whereby large chips are prevented from forming in front of the cutter. The surface geometry includes recess(es) and/or raised region(s) that can act as chip breakers and also increase turbulence in the flow across the face of the cutter and thus increase the Heat transfer coefficient and reduce drag. PCD surface's geometric configuration is formed in the high temperature/high heat (HT/HP) process and is therefore integral with the cutter. This invention thus provides a polycrystalline cutter with improved cutting capability by preventing chip build up and enhanced heat transfer resulting in a cooler cutting edge temperature.

11 Claims, 3 Drawing Sheets

CUTTER
DIRECTION

POLYCRYSTALLINE DIAMOND COMPACT CUTTER WITH IMPROVED CUTTING BY PREVENTING CHIP BUILD UP

BACKGROUND OF THE INVENTION

The present invention relates to supported polycrystalline diamond (PCD) compacts made under high temperature/high pressure (HT/HP) processing conditions, and more particularly to supported PCD compacts having improved shear strength, impact resistance properties and cutting performance.

A compact may be characterized generally as an integrally-bonded structure formed of a sintered, polycrystalline mass of abrasive particles, such as diamond, CBN, CBN compounds and ceramics and other like compounds. Although such compacts may be self-bonded without the aid of a bonding matrix or second phase, it generally is preferred, as is discussed in U.S. Pat. Nos. 4,063,909 and 4,601,423 to employ a suitable bonding matrix which usually is a metal such as cobalt, iron, nickel, platinum, titanium, chromium, tantalum, or an alloy or mixture thereof. The bonding matrix, which is provided at from about 10% to 30% by volume, additionally may contain a recrystallization or growth catalyst such as aluminum for CBN or cobalt for diamond.

Abrasive compacts are used extensively in cutting, milling, grinding, drilling, and other abrasive operations. The abrasive compacts typically consist of polycrystalline diamond, CBN or like particles bonded into a coherent hard conglomerate. The abrasive particle content of the abrasive compact is high and there is an extensive amount of direct particle-to-particle bonding. Abrasive compacts are made under elevated temperature and pressure conditions at which the abrasive particles, be it diamond, CBN, CBN compounds or ceramics or like compounds, are crystallographically stable.

Abrasive compacts tend to be brittle and, in use, they are frequently reinforced by a cemented carbide substrate. Such supported abrasive compacts are known in the art as composite abrasive compacts. Composite abrasive compacts may be used as such in the working surface of an abrasive tool. Alternatively, particularly in drilling and mining operations, it has been found advantageous to bond the composite abrasive compact to an elongated cemented carbide pin to produce what is known as a stud cutter. The stud cutter then is mounted, for example, in the working surface of a drill bit or a mining pick.

Fabrication of the composite compact typically is achieved by placing a cemented carbide substrate into the container of a press. A mixture of diamond grains or diamond grains and catalyst binder is placed atop the substrate and compressed under HP/HT conditions. In so doing, metal binder migrates from the substrate and "sweeps" through the diamond grains to promote a sintering of the diamond grains. As a result, the diamond grains become bonded to each other to form a diamond layer which concomitantly is bonded to the substrate along a conventionally planar interface. Metal binder remains disposed in the diamond layer within pores defined between the diamond grains.

For many applications, it is preferred that the compact is supported by its bonding to substrate material to form a laminate or supported compact arrangement. Typically, the substrate material is provided as a cemented metal carbide which comprises, for example, tungsten, titanium, or tantalum carbide particles, or a mixture thereof, which are bonded together with a binder of between about 6% to about 25% by weight of a metal such as cobalt, nickel, or iron, or a mixture or alloy thereof. As is shown, for example, in U.S. Pat. Nos. 3,381,428; 3,852,078; and 3,876,751, compacts and supported compacts have found acceptance in a variety of applications as parts or blanks for cutting and dressing tools, as drill bits, and as wear parts or surfaces.

The basic HT/HP method for manufacturing the polycrystalline compacts and supported compacts of the type herein involved entails the placing of an unsintered mass of abrasive, crystalline particles, such as diamond, CBN, CBN compounds and ceramics and like compounds and/or a mixture thereof, within a protectively shielded metal enclosure which is disposed within the reaction cell of a HT/HP apparatus of a type described further in U.S. Pat. Nos. 2,947,611; 2,941,241; 2,941,248; 3,609,818; 3,767,371; 4,289,503; 4,673,414, and 4,954,139. Additionally, a metal catalyst may be placed in the enclosure with the abrasive particles if the sintering of diamond particles is contemplated, as well as a pre-formed mass of a cemented metal carbide for supporting the abrasive particles and to thereby form a supported compact therewith. The contents of the cell then are subjected to processing conditions selected as sufficient to effect intercrystalline bonding between adjacent grains of the abrasive particles and, optionally, the joining of the sintered particles to the cemented metal carbide support. Such processing conditions generally involve the imposition for about 3 to 120 minutes of a temperature of at least 1300° C. and a pressure of at least 20 kbar.

As to the sintering of polycrystalline diamond compacts or supported compacts, the catalyst metal may be provided in a pre-consolidated form disposed adjacent the crystal particles. For example, the metal catalyst may be configured as an annulus into which is received a cylinder of abrasive crystal particles, or as a disc which is disposed above or below the crystalline mass. Alternatively, the metal catalyst, or solvent as it is also known, may be provided in a powdered form and intermixed with the abrasive crystalline particles, or as a cemented metal carbide or carbide molding powder which may be cold pressed into shape and wherein the cementing agent is provided as a catalyst or solvent for diamond recrystallization or growth. Typically, the metal catalyst or solvent is selected from cobalt, iron, or nickel, or an alloy or mixture thereof, but other metals such as ruthenium, rhodium, palladium, chromium, manganese, tantalum, and alloys and mixtures thereof also may be employed.

Under the specified HT/HP conditions, the metal catalyst, in whatever form provided, is caused to penetrate or "sweep" into the abrasive layer by means of diffusion, capillary action or pressure gradient and is thereby made available as a catalyst or solvent for recrystallization or crystal intergrowth. The HT/HP conditions, which preferably operate in the diamond stable thermodynamic region above the equilibrium between diamond and graphite phases, effect a compaction of the abrasive crystal particles which is characterized by intercrystalline diamond-to-diamond bonding wherein parts of each crystalline lattice are shared between adjacent crystal grains. Preferably, the diamond concentration in the compact or in the abrasive table of the supported compact is at least about 70% by volume. Methods for making diamond compacts and supported compacts are more fully described in U.S. Pat. Nos. 3,141,746; 3,745,623; 3,609,818; 3,850,591; 4,394,170; 4,403,015; 4,797,326, and 4,954,139.

As to polycrystalline CBN compacts, CBN ceramics and supported compacts, such compacts and supported compacts are manufactured in general accordance with the methods suitable for diamond compacts. However, in the formation of CBN compacts or ceramics via the previously described "sweep-through" method, the metal which is swept through the crystalline mass need not necessarily be a catalyst or solvent for CBN recrystallization. Accordingly, a polycrystalline mass of a CBN composition may be joined to a cobalt-cemented tungsten carbide substrate by the sweep through of the cobalt from the substrate and into the interstices of the crystalline mass notwithstanding that cobalt is not a catalyst or solvent for the recrystallization of the CBN composition. Rather, the interstitial cobalt functions as a binder between the polycrystalline CBN compacts or ceramics and the cemented tungsten carbide substrate.

As it was for diamond, the HT/HP sintering process for CBN is effected under conditions in which CBN is the thermodynamically stable phase. It is speculated that under these conditions, intercrystalline bonding between adjacent crystal grains also is effected. The CBN concentration in the compact or in the abrasive table of the supported compact is preferably at least about 50% by volume. Methods for making CBN compacts and supported compacts are more fully described in U.S. Pat. Nos. 2,947,617; 3,136,615; 3,233,988; 3,743,489; 3,745,623; 3,831,428; 3,918,219; 4,188,194; 4,289,503; 4,673,414; 4,797,326, and 4,954,139. Exemplary CBN compacts are disclosed in U.S. Pat. No. 3,767,371 to contain greater than about 70% by volume of CBN and less than about 30% by volume of a binder metal such as cobalt. Such compacts are manufactured commercially by General Electric Company under the trademark BZN 6000.

As is described in U.S. Pat. No. 4,334,928 yet another form of a polycrystalline compact, which form need not necessarily exhibit direct or intercrystalline bonding, involves a polycrystalline mass of diamond or CBN particles having a second phase of a metal or alloy, a ceramic, or a mixture thereof. The second material phase is seen to function as a bonding agent for the abrasive crystal particles. Polycrystalline diamond and polycrystalline CBN compacts containing a second phase of a cemented carbide are exemplary of these "conjoint" or "composite" polycrystalline abrasive compacts. Such compacts may be considered to be "thermally-stable" as compared to metal-containing compacts as having service temperatures above about 700° C. Compacts as those described in U.S. Pat. No. 4,334,928 to comprise 80 to 10% by volume of CBN and 20 to 90% by volume of a nitride binder such as titanium nitride also may be considered exemplary of a thermally-stable material. Such compacts are manufactured commercially by General Electric company under the trademark BZN 8100.

With respect to supported compacts, it is speculated, as is detailed in U.S. Pat. No. 4,797,326 that the bonding of the support to the polycrystalline abrasive mass involves a physical component in addition to a chemical component which develops at the bondline if the materials forming the respective layers are interactive. The physical component of bonding is seen to develop from the relatively lower coefficient of thermal expansion (CTE) of the polycrystalline abrasive layer as compared to the cemented metal support layer. That is, upon the cooling of the supported compact blank from the HT/HP processing conditions to ambient conditions, it has been observed that the support layer retains residual tensile stresses which, in turn, exert a radial compressive loading on the polycrystalline compact supported thereon. This loading maintains the polycrystalline compact in compression which thereby improves fracture toughness, impact, and shear strength properties of the laminate.

In the commercial production of supported compacts it is common for the product or blank which is recovered from the reaction cell of the HT/HP apparatus to be subjected to a variety or finishing operations which include cutting, such as by electrode discharge machining or with lasers, milling, and especially grinding to remove any adherent shield metal from the outer surfaces of the compact. Such finishing operations additionally are employed to machine the compact into a cylindrical shape or the like which meets product specifications as to diamond or CBN abrasive table thickness and/or carbide support thickness. Especially with respect to diamond and CBN supported compacts and ceramics, a substantially uniform abrasive layer thickness is desirable since the abrasive tables on the blanks are often machined by the user into final products having configurations which are tailored to fit particular applications. It will be appreciated, however, that during such finishing operations the temperature of the blank, which previously had been exposed to a thermal cycle during its HT/HP processing and cooling to room temperature, can be elevated due to the thermal effects of grinding or cutting operations. Moreover, the blank or product finished therefrom may be mounted onto the steel shank of a variety of cutting or drilling tools using braze or solder techniques requiring temperatures of from about 750° to about 800° C. to melt the filler alloy. This again subjects the compacts and supports to thermal gradients and stresses. During each of the thermal cyclings of the supported blank, the carbide support, owing to its relatively higher CTE, will have expanded to a greater extent than the abrasive compact supported thereon. Upon heating and cooling, the stresses may cause cracking of the abrasive table and/or delamination of the abrasive table from its support.

To improve the bond strength at the interface between, particularly, PCD compacts and their cemented metal carbide supports, proposals have been made to interpose an intermediate layer between the PCD and carbide layers. As is detailed in U.S. Pat. Nos. 4,403,015 and 5,037,704 the intermediate layer is provided to contain less than about 70% by volume of CBN and a balance of a nitride such as TiN, and is sintered directly between the PCD and carbide layers using the traditional HT/HP method. The interposition of a CBN-TiN bonding layer has been observed to prevent the influx or "sweep" of the cobalt binder from the carbide layer to the PCD layer wherein it would have otherwise catalyzed the back-conversion of diamond to graphite, thereby weakening the interface between the PCD and carbide layers.

As the supported PCD compacts heretofore known in the art have garnered wide acceptance for use in cutting and dressing tools, drill bits, and the like, it will be appreciated that further improvements in the strength and impact properties of such materials would be well-received by the industry. Especially desired would be supported diamond compacts having improved fracture toughness, impact, and shear strengths which would expand the applications for such material by enhancing their machinability, performance, and wear properties. Thus, there has been and heretofore has remained a need for supported PCD compacts having improved physical properties.

Recently, various PCD compact structures have been proposed in which the diamond/carbide interface contains a number of ridges, grooves, or other indentations aimed at reducing the susceptibility of the diamond/carbide interface to mechanical and thermal stresses. In U.S. Pat. No. 4,784, 023 a PCD compact includes an interface having a number of alternating grooves and ridges, the top and bottom of which are substantially parallel with the compact surface and the sides of which are substantially perpendicular to the compact surface.

U.S. Pat. No. 4,972,637 provides a PCD compact having an interface containing discrete, spaced-apart recesses extending into the cemented carbide layer, the recesses containing abrasive material (e.g., diamond) and being arranged in a series of rows, each recess being staggered relative to its nearest neighbor in an adjacent row. It is asserted in the '637 patent that as wear reaches the diamond/ carbide interface, the recesses, filled with diamond, wear less rapidly than the cemented carbide and act, in effect, as cutting ridges or projections. When the PCD compact is mounted on a stud cutter, as shown in FIG. 5 of the '637 patent, the wear plane exposes carbide regions which wear more rapidly than the diamond material in the recesses. As a consequence, depressions develop in these regions between the diamond filled recesses. The '637 patent asserts that these depressed regions, which expose additional edges of diamond material, enhance the cutting action of the PCD compact.

U.S. Pat. No. 5,007,207 presents an alternative PCD compact structure having a number of recesses in the carbide layer, each filled with diamond, which recesses are formed into a spiral or concentric circular pattern (looking down at the disc shaped compact). Thus, the '207 structure differs from the '637 structure in that, rather than employing a large number of discrete recesses, the '207 structure uses one or a few elongated recesses which form a spiral or concentric circular pattern. FIG. 5 in the '207 patent shows the wear plane which develops when the PCD is mounted and used on a stud cutter. As with the '637 structure, the wear process creates depressions in the carbide material between the diamond filled recesses in the '207 structure. Like the '207 patent, the '637 patent also asserts that these depressions, which develop during the wear process, enhance cutting action.

Whereas the aforementioned patents assert a desirable cutting action in the rock, it is also highly desirable to minimize the diamond layers susceptibility to fracture and spall which in part arises from the internal residual stresses.

All of the above-mentioned patents are incorporated herein by reference.

SUMMARY OF THE INVENTION

The present invention relates to a PCD cutter having a new cutting surface configuration whereby the formation of large chips in front of the cutter is substantially reduced or eliminated during use. The cutting surface's geometric configuration includes a non-planner region which may comprise one or more recesses and/or one or more raised regions that act as chip breakers as well as to increase turbulence in the flow across the face of the cutter, thereby increasing heat transfer and reducing the temperature at the cutting edge of the PDC. The PCD surface geometry is preferably formed in the HT/HP process and is therefore integral with the cutter. However, it is within the scope of the present invention to form such surface geometry through post-pressing processing such as by grinding or electrical discharge machining.

DETAILED DESCRIPTION OF THE PREFERRED EMBODIMENTS

The present invention reduces large rock chip formation in front of PCD cutters which may effect the rate of penetration and weight on a bit used for drilling. Long continuous chips of rock may also interfere with cutting action. Also heat generation at the cutter tip may cause high temperatures which shorten the life of the cutter. Kerfing is sometimes used to upset rock at a cutting edge. The present invention breaks a chip that has already formed and also increases the heat transfer away from the cutting edge on the face of the cutter. Thus, the present invention provides a polycrystalline cutter having improved cutting capability by preventing chip build up and introducing more localized turbulent flow.

Preferably the polycrystalline compacts of the present invention are formed into the desired shape during the HT/HP process rather than by postpressing processing. Suitable HP/HT apparatus for making the compacts of the present invention are well known to those skilled in the art and include, among others, belt type apparatus as described in U.S. Pat. No. 2,941,948, incorporated herein by reference, and cubic apparatus. Similarly, the patents identified above disclose the operational conditions required to form the compacts of the present invention and are well known to those skilled in the art.

The compacts of the present invention have an abrasive layer 14 which is substantially planar and which further includes (1) a recess behind the cutting edge of such abrasive layer, or (2) a raised surface area, that may be considered either higher or thicker in the vertical direction than the median height or thickness of the surrounding area, ("bump") behind the cutting edge, or both 1 and 2.

Figure 1:
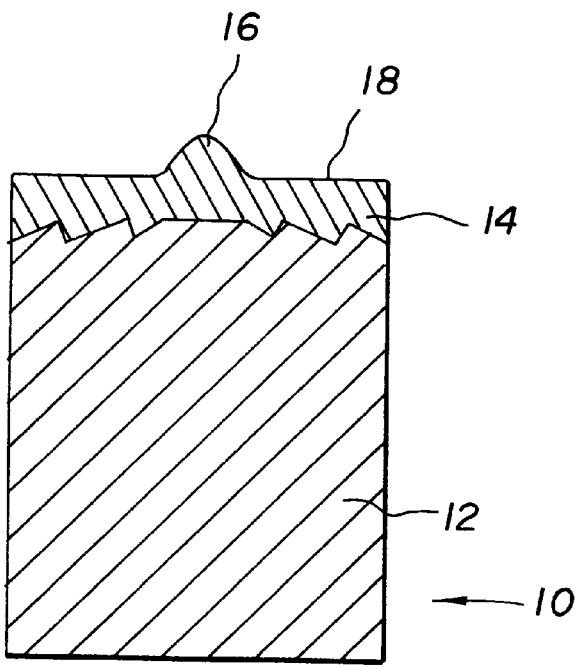
FIG. 1 shows a cutter having a protrusion or "bump" like area at or near the center of the PCD table to break chips and to cause turbulence.

Turning to FIG. 1, cutter 10 comprises a cemented carbide substrate 12, such as, for example, tungsten carbide, tantalum carbide or other such substrate known to those skilled in the art. Disposed on the surface of substrate 12 is abrasive layer or table 14. Preferably, abrasive table 14 is polycrystalline diamond, cubic boron nitride or mixtures thereof, and most preferably is polycrystalline diamond.

In the embodiment shown in FIG. 1, bump 16 is put at or near the center of table 14 to break chips and cause turbulence so as to remove debris from in front of cutter 10. The area 18 adjacent to bump 16 is substantially planar. Bump 16 is preferably hemispherical but may be any other shape effective for causing chips to break and cause turbulence. Protrusion 16 generally has a height or thickness in the range of from about 0.1 mm to about 3 rnm and preferably is between about 0.5 mm and about 1.0 mm. The lateral dimensions can vary broadly and can readily be determined by the artisan without undue experimentation. Generally, for a hemispherical protrusion 16, the diameter at the interface of protrusion 16 and table 14 will be from about 0.2 mm to about 5 mm and preferably will be from about lmm to about 3 mm.

The interface between abrasive layer 14 and substrate 12 can be of any shape or construction known to those skilled in the art. It has been found, however, that non-planar interfaces provide the most effective performance.

Figure 2:
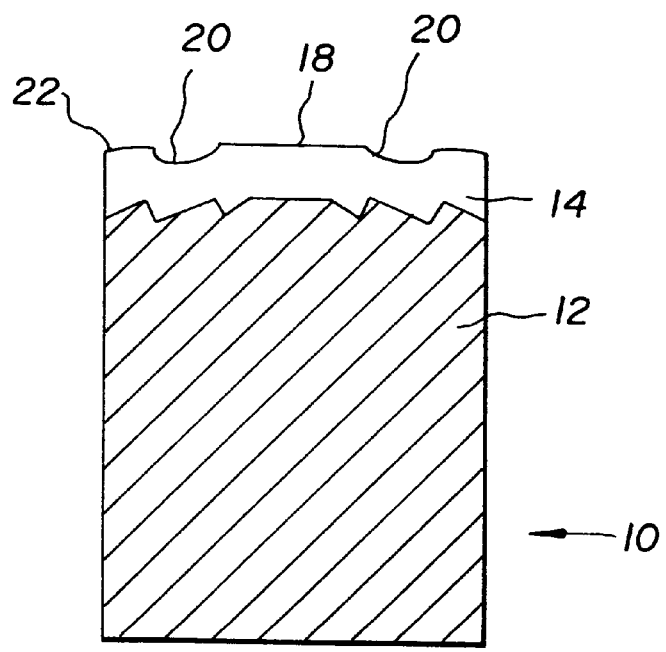
FIG. 2 shows a cutter having a recess behind the cutting edge which is effective for breaking chips formed during use.

FIG. 2 shows an alternate embodiment of the present invention in which cutter 10 comprises substrate 12 and abrasive table 14, wherein recess 20 is etched into table 14 behind its cutting edge 22. Recess 20 preferably has a depth of from about 0.1 mm to about 0.7 mm, but may extend further into and through table 14. Recess 20 is generally widest at the surface of table 14 or is of a uniform cross section. Recess 20 may also be filled with cemented carbide, such as tungsten carbide, which will wear away during use.

Figure 3:
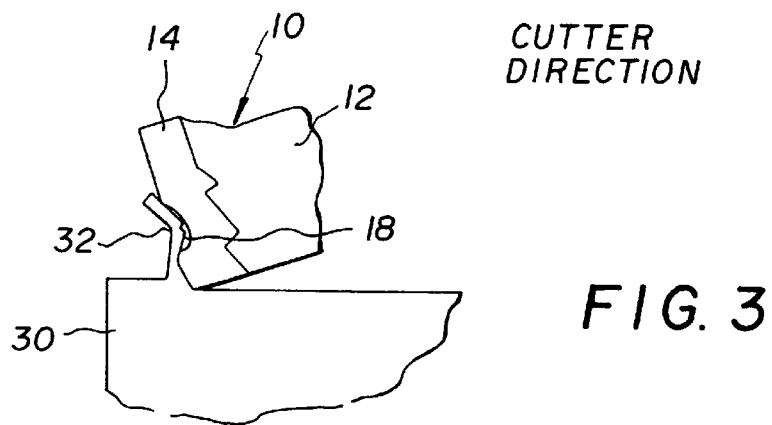
FIG. 3 illustrates how the geometry of the PDC cutter shown in FIG. 2 causes chips to break.

As shown in FIG. 3, cutter 10 moves through the work piece, such as rock 30, forming chip 32. The surface geometry, namely, recess 18 in table 14 of FIG. 2, or bump 16 in table 14 of FIG. 1, of cutter 10 causes high stresses in the forming chip 32 causing it to break.

Figure 4:
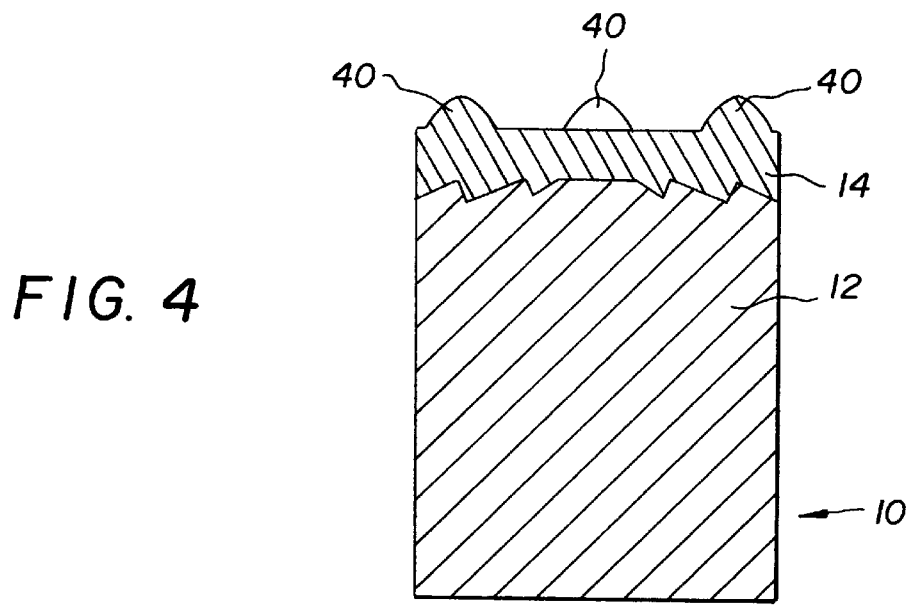
FIG. 4 shows a cut away view of a cutter having multiple "bumps" on the PCD table to break chips and cause turbulence.
Figure 5:
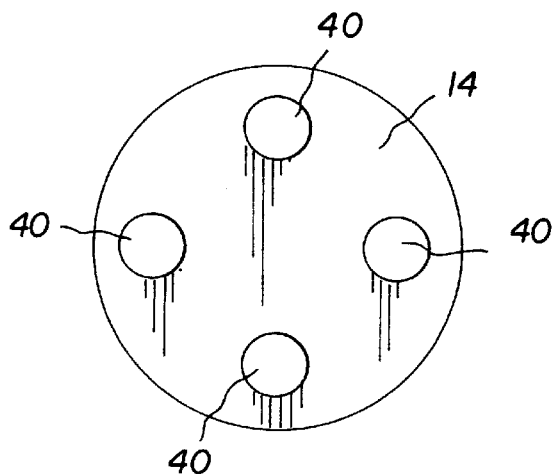
FIG. 5 shows a top plan view of the cutter of FIG. 4.

FIGS. 4 and 5 show another embodiment of the present invention in which table 14 includes multiple bumps 40. This embodiment is particularly preferred if the cutting edge of cutter 10 may be changed during use or subsequent use.

Figure 6:
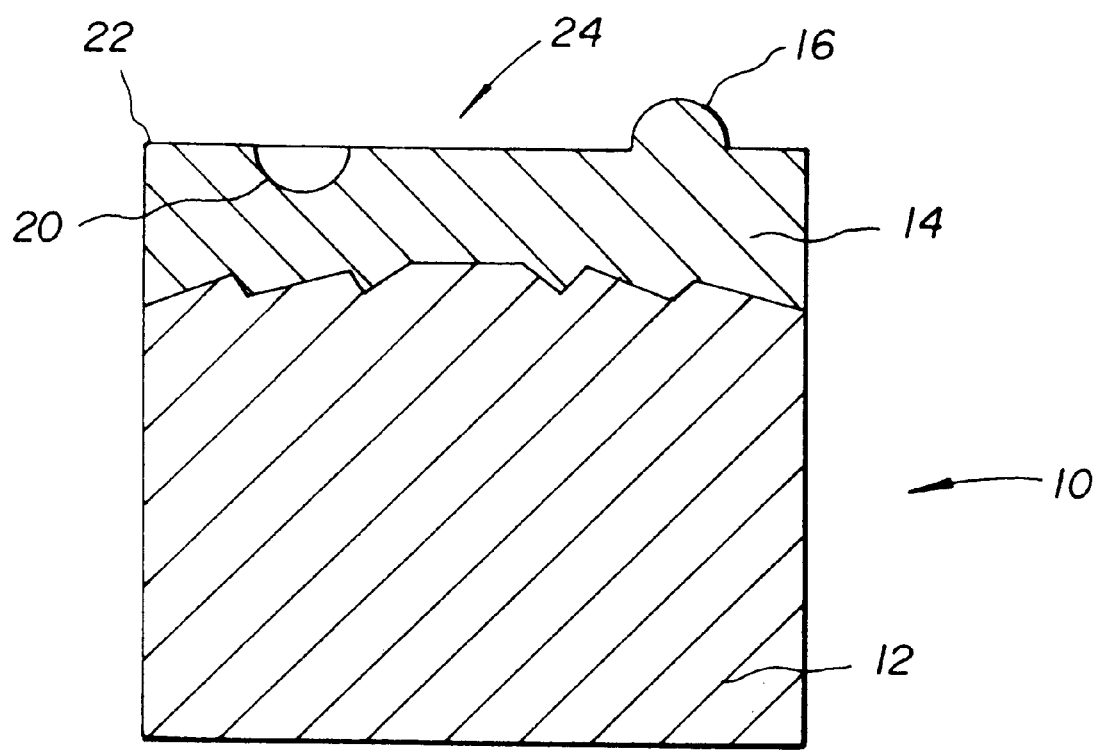
FIG. 6 shows a cut away of a cutter having one recess and one raised hemispherical region.

FIG. 6 shows an alternate embodiment of the present invention in which cutter 10 comprises substrate 12 and abrasive table 14 wherein recess 20 is etched into abrasive table 14 behind cutting edge 22. As stated in the description of FIG. 2, recess 20 preferably has a depth of from about 0.1 mm to about 0.7 mm but may extend further into and through abrasive table 14. Recess 20 is generally widest at the surface of table 14 or is of a uniform cross section. Recess 20 may also be filled with cemented carbide, such as tungsten carbide, which will wear away during use. The bump 16 and recess 20 act as chip breakers as well as to increase turbulence in the flow across cutting surface 24 of the cutter thereby increasing heat transfer and reducing the temperature at cutting edge 22 of abrasive table 14.

The surface geometry for any of the above embodiments may be formed in the HP/HT process. Alternatively, the surface geometry may be formed by post-pressing operations such as grinding or electrical discharge machining.

Although the present invention has been described in detail with reference to certain preferred embodiments, other variations are possible and are intended to be within the scope of the claims.

What is claimed is:

1. An abrasive compact comprising
   (a) layer having a first and second side, a cemented carbide substrate bonded to the second side and a cutting edge, and
   (b) the first side has a cutting surface including a substantially planar region and at least one non-planar region comprised of at least one raised hemispherical region, said non-planar region acts a chip breaker and increases turbulence across the cutting surface.

2. An abrasive compact according to claim 1 wherein said abrasive layer is selected from the group consisting of a polycrystalline diamond and cubic boron nitride.

3. An abrasive compact according to claim 2 wherein said cemented carbide substrate is selected from the group consisting of tungsten carbide, tantalum carbide and titanium carbide.

4. An abrasive compact according to claim 1 wherein the abrasive layer has a single raised hemispherical region.

5. An abrasive compact according to claim 1 wherein the least one raised hemispherical region has a maximum thickness of from about 0.1 mm to about 3 mm.

6. An abrasive compact according to claim 5 wherein the at least one raised hemispherical region has a maximum thickness of from about 0.5 mm to about 1.0 mm.

7. An abrasive compact according to claim 1 wherein the diameter of the at least one raised hemispherical region is from about 0.2 mm to about 5 mm.

8. An abrasive compact according to claim 7 wherein the diameter of the at least one raised hemispherical region is from about 1 mm to about 3 mm.

9. An abrasive compact according to claim 1 wherein said non-planar region comprises 4 raised hemispherical regions.

10. An abrasive compact comprising
    (a) an abrasive layer having a first and second side, a cemented carbide substrate bonded to the second side and a cutting edge, and
    (b) the first side has a cutting surface including a substantially planar region acts as a chip breaker and increases turbulence across the cutting surface.

11. An abrasive compact comprising
    (a) and abrasive layer having a first and second side, a cemented carbide substrate bonded to the second side and a cutting edge, and
    (b) the first side has a cutting surface including a substantially planar region, and at least one non-planar region which consists of one recess and one raised hemispherical region, said at least on non-planar region acts as a chip breaker and increases turbulence across the cutting surface.

* * * * *